July 11, 1967 — J. L. FAGAN — 3,330,328
ALCOVES FOR LOCOMOTIVE CABS
Filed Aug. 16, 1965 — 2 Sheets-Sheet 1

INVENTOR:
James L. Fagan
By Stevens, Rehrer & Stevens
Attys

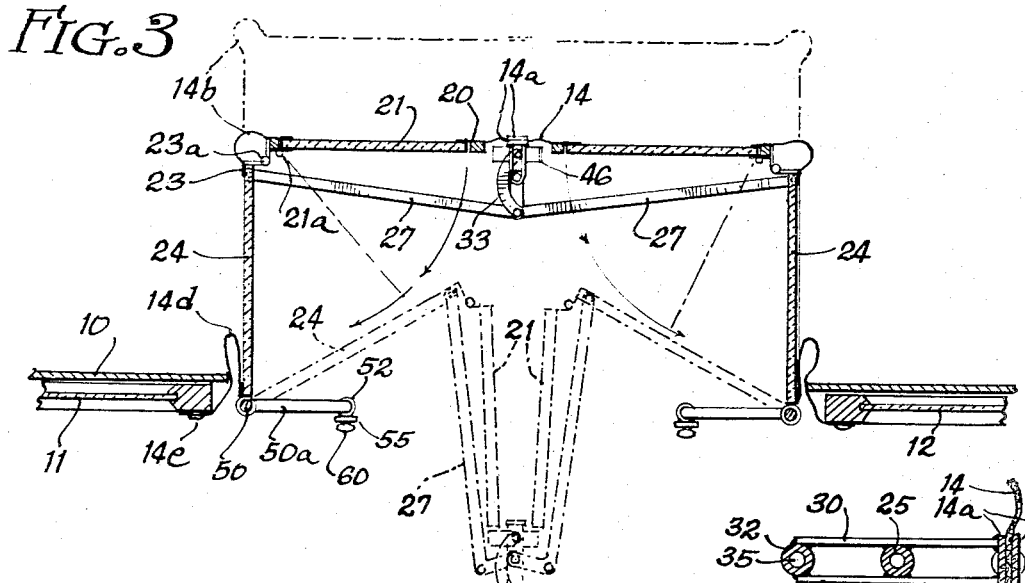
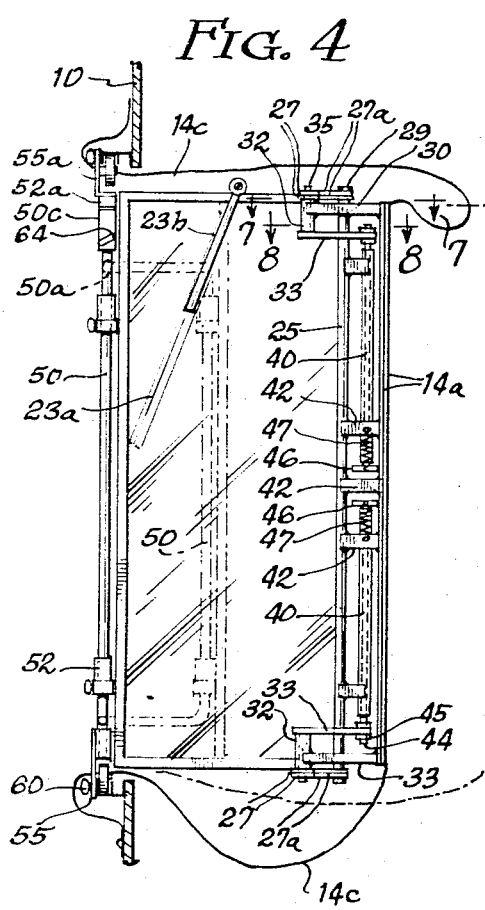
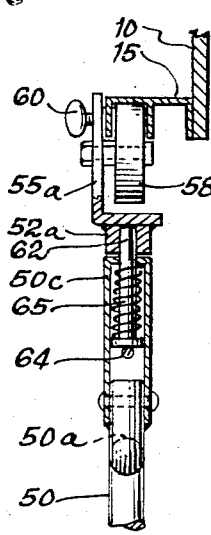
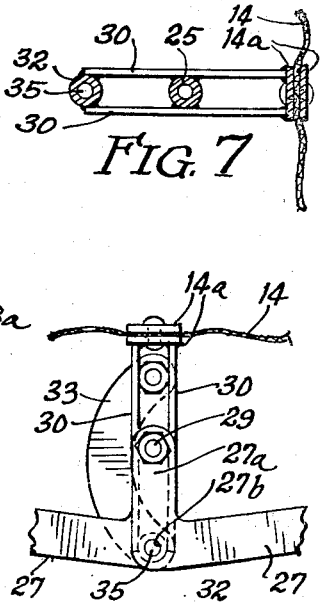
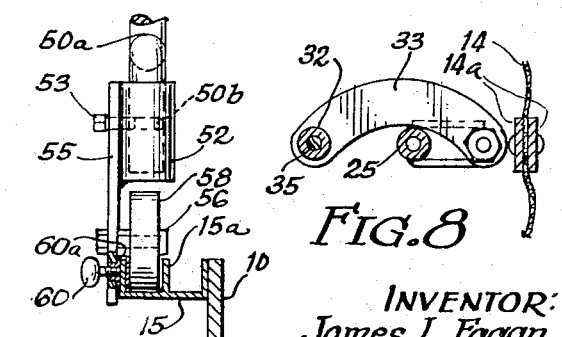

3,330,328
ALCOVES FOR LOCOMOTIVE CABS
James L. Fagan, 1701 N. 43rd Ave.,
Melrose Park, Ill. 60464
Filed Aug. 16, 1965, Ser. No. 479,835
8 Claims. (Cl. 160—88)

ABSTRACT OF THE DISCLOSURE

An alcove normally extending from the side of a locomotive cab for a view ahead and behind through windows. The alcove has a mechanism for folding it to the cab before entering a tunnel, and a control to extend it additionally from the normal position for a better view in the directions stated.

My invention relates to means which afford protection from climatic conditions for engineers who lean out of their cabs for a better view of the right of way, and more particularly to an alcove for this purpose patented by me on May 25, 1948, under Patent No. 2,442,236.

In the patented structure, the side windows of the alcove were permanently built in, and therefore could not be opened for the ventilation of the alcove. It is therefore one object of the present improvement to build the side of the alcove with permanent window frames, and to install windows in the latter which can be opened when the alcove is used during good weather.

While the patented alcove adds side room to the cab for a better view of objects ahead from the side, a still wider view is often desirable when the locomotive has ample clearance on the side, and a further object of the improvement is therefore to provide means for extending the alcove sidewise to an additional depth, whereby to gain a better point of vantage for a view from the side.

Another object is to provide an improved mechanism for folding the alcove in case its use is not desired or side clearance for the train is expected to be close, such as in a tunnel or between the side girders of a bridge.

Another disadvantage of the patented alcove is the difficulty of removing the alcove in case a clear window opening in the side of the cab is desirable for the escape of the engineer or other occupant of the cab in the event of a fire or other emergency where the opening for the alcove is the only available one; and a further object of the improvement is to provide simple means for disconnecting the alcove from the cab opening in which it is installed for a manual push to cast it out of the cab and clear the opening.

An additional object is to provide a mechanism for folding the alcove which is constructed more simply than the one in the patent.

A better understanding of the invention may be gained by reference to the accompanying drawings, in which:

FIG. 3 is a section on the line 3—3 of FIG. 2 showing the alcove extended beyond its regular position by means of dot-and-dash lines;

FIG. 4 is a vertical section on the line 4—4 of FIG. 2;

FIG. 5 is an enlargement of the left-hand portion of FIG. 4, partly in section and broken away between upper and lower portions;

FIG. 6 is a magnified section on the line 6—6 of FIG. 2; and

Figure 1:
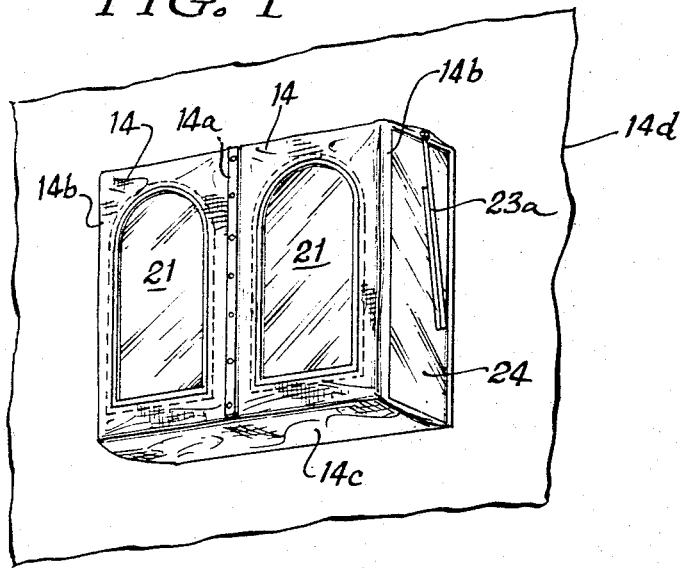
FIG. 1 is a perspective view of the alcove from the outside.

FIGS. 7 and 8 are enlarged sections on the line 7—7 and 8—8 of FIG. 4.

Referring specifically to the drawings 10 denotes a side wall of the locomotive cab; and front and rear windows 11 and 12 occur along the side of the cab, and are spaced for the interposition of the alcove 14. Top and bottom tracks 15 are provided for the windows, such tracks having a divider 15a in the region of the alcove, as seen in FIG. 5.

Figure 2:
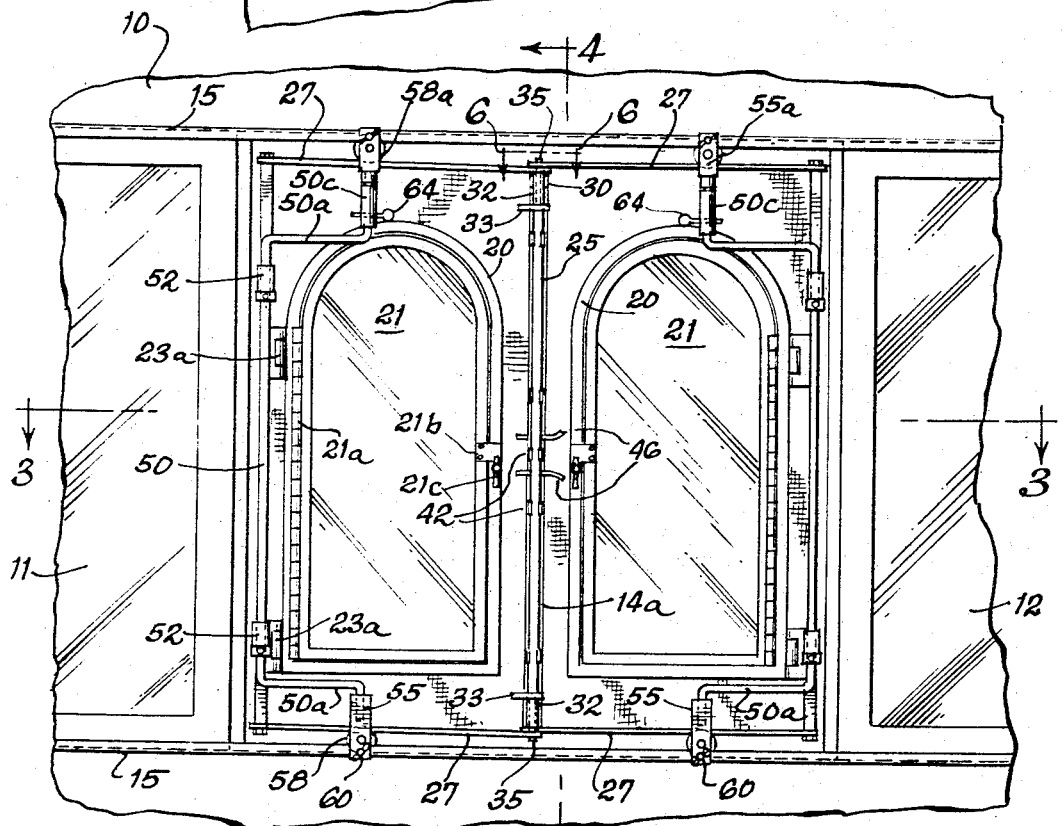
FIG. 2 is an enlarged view of the cab wall from the inside, showing the alcove installed in a space between a pair of side windows.

The improved alcove is constructed with frames 20 for a pair of side windows 21, and frames 23 for front and rear window panes 24. These do not open, but are hinged at 23a to the side frames 20; and FIG. 2 shows that the side windows are hinged to the frames 20 at 21a, and carry wings 21b which are locked by turn buttons 21c on the frames in order to keep the windows closed. The frames 23 also carry wipers 23a outside the panes 24, as noted in FIG. 4, with handles 23b on the inside for operating the wipers.

As in the aforesaid patent, the alcove is designed to fold inwardly to the position indicated by dotted lines in the lower part of FIG. 3 when side clearance for the cab is close. For this purpose the frames 23 of the front and rear windows are designed to pivot at their inner ends on a pair of vertical rods 50. Also, at the top each frame has a bar 27 extending to the center of the alcove (see FIG. 3) the bars having outward bends 27a which rest on each other and terminate over a rod 26 to be pivoted on the same as indicated at 29 in FIGS. 4 and 6.

It is noted in FIGS. 3 and 4 that the flexible material of the alcove 14 is reinforced in and out by doubled vertical strips 14a; and these are used—by means of a pair of brackets 30—to support a vertical sleeve 32 under the corners of the bars 27, as seen in FIG. 4. A horizontal arm 33 has its inner end portion under the sleeve 30 and carries a pin 35 which rises through the sleeve and registering apertures 27b in the corners of the bars 27 to terminate slightly above such corners, as noted at the top of FIG. 4. Normally, the pin 35 keeps the said corners together, and the bars 27 cannot therefore break to the folded portion of FIG. 3. However, a short descending movement of the arm 33 lowers the pin 35 out of the apertures 27b. The mechanism just described is duplicated at the bottom of the alcove, and the simultaneous retraction of both pins 35 therefore permits the bars 27 to be folded to the dotted-line position of FIG. 3, and the alcove to be collapsed close to the side of the locomotive cab.

Means are provided inwardly of the doubled strips 14a—that is, in the center of the alcove—to gather the arms 33 by a manual squeezing operation when the folding of the alcove is desired. A pair of alined vertical tubes 40 are located inwardly of the strips 14a, as seen in FIG. 4. A set of twin brackets 42—like the brackets 30—is directed inwardly from the strips 14a and attached to the tubes 40 and the rod 25 by welding. Rods 44 are slidable in the tubes 40 and attached by securing nuts 45 to the arm 33; and these are bowed in order to bypass the rod 25 on the way to the sleeves 32. At center-height in the alcove the rods 44 carry hand-grips 46 which draw on springs 47 secured to the nearest brackets 42 when squeezed, gathering the arms 33.

As mentioned before, it is desirable at times to look in forward or rearward direction from the alcove at a better point of lateral vantage. This is made possible by extending the alcove in outward direction, such as to the position indicated by dot-and-dash lines at the top of FIG. 3. Thus, the vertical rods 50 on which the inner ends of the front and rear frames 23 are pivoted are bent toward each other at the bottom with cranks 50a seating in sockets 52. The rods 50 are narrowed with necks 50b inside the sockets to receive set screws 53 designed to retain the cranks but allow them to turn in the sockets. When this is done in the direction of the curved arrows in the lower part of FIG. 3, the alcove will advance sidewise to the position indicated by dot-and-dash lines in the same figure and at the right in FIG. 4, providing the added view from the side through the front or rear window. As shown in FIGS. 1 and 3, the alcove 14 is a flexible enclosure with slack 14b at the sides, and 14c at the top and bottom (see FIG. 4) to permit the advance just mentioned; and extra slack 14d is provided between the alcove and the cab windows 11 and 12, with snap fasteners at 14e (see FIG. 3) applied to such windows.

The advance under consideration must be accompanied by the separation of the rod cranks 50a in order to keep the front and rear windows in their normal, parallel planes. This is done by extending the sockets 52 downwardly with hangers 55, these carrying bearings 56 for rollers 58 which ride in the inner channel of the bottom track 15, as seen in the lower portion of FIGS. 2 and 5. The hangers carry thumbscrews 60 with clamps 60a engaging the inner track wall in order to lock the cranks 50a from separation in the track. FIG. 5 shows a duplicate 55a of the hanger 55 applied to the upper track 15, with rollers 58a mounted to duplicate the function of the rollers 58; and each hanger 55a carries a shorter duplicate 52a of the socket 52. A tubular extension 50c of each rod 50 carries a plunger 62 supported by a cotter pin 64 passed through the extension 50c with the effect of keeping the plunger 62 seated in the socket 52a. A compression spring 65 in the socket forces the retraction of the plunger when the cotter pin is pulled out.

It is now apparent that the alcove installation described above is supported in the outer region by the doubled strips 14a, and in the inner region by the crank rollers 58 riding in the lower track 15; and both tracks guide the related rollers for the added movement of the alcove. It is possible to open the side windows 21 of the alcove for ventilation whether the alcove is in the normal or extended position. Also, in case of an emergency—such as a fire in the cab—which bars exit from the other side or rear, it is possible to remove the alcove by pushing it out of the cab to fall at the wayside, leaving an opening of ample size for the escape of the cab occupant. This is done by first removing the cottor pins 64, then loosening the thumbscrews 60. The rod extensions 50c are now free of the connections with the upper track, and may be swung aside to permit them and the hangers 55a to be gathered clear of the tracks. Now the alcove may be given an outward push to draw its marginal flaps 14b and 14c out of the cab, and pull apart the snap fasteners 14e connecting the side folds with the cab windows, this freeing the alcove to fall away from the cab. An alcove improvement is thus had which embodies a number of mechanical and functional advantages over the one in my aforesaid patent.

I claim:

1. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising supports in the top and bottom of said opening, and cranks extended from said rods and rotatable in the supports to move the rods as stated.

2. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising tracks in the top and bottom of said opening, and cranks extended from said rods and rotatable in sockets to move the rods as stated, the sockets being separably supported along said tracks to maintain the normal positions of said windows during the rotation of the rods.

3. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising tracks in the top and bottom of said opening, cranks extended from said rods and rotatable with end portions in sockets to move the rods as stated, such end portions each having an annular groove, and a set screw directed through the socket into the groove to retain the end portion in the socket while allowing it to rotate therein.

4. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising tracks in the top and bottom of said opening, cranks rotatable in sockets to move the rods as stated, and wheeled extensions from the sockets riding in said tracks to separate the rod and maintain the normal positions of said windows during the rotation of the rods.

5. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising tracks in the top and bottom of said opening, cranks rotatable in sockets to move the rods as stated, wheeled extensions from the sockets riding in said tracks to separate the rods and maintain the normal positions of said windows during the rotation of the rods, and means to fix the extensions to the tracks at any point in their riding travel.

6. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising tracks in the top and bottom of said opening, cranks rotatable in the sockets to move the rods as stated, wheeled extensions from the sockets riding in said tracks to separate the rods and maintain the normal positions of said windows during the rotation of the rods, and clamps directed from the extensions to secure them at any point along the tracks.

7. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising supports in the top and bottom of said opening, cranks extending from said rods and rotatable in the supports, means releasing the cranks for removal from the supports by gathering and angular movements, and joints in the rods separable to permit such movements, whereby to free the alcove for discarding it from said opening to leave the latter clear.

8. An alcove projected outwardly from an opening in a side wall of a locomotive cab, such alcove having front and rear windows normally parallel and hinged on vertical rods in the ends of said opening, and means for moving said rods outwardly to project the alcove to a further extent, said means comprising supports in the top and bottom of said opening, cranks extending from said rods and rotatable in the supports, means releasing the cranks for removal from the supports by gathering and angular movements, joints in the rods separable to permit such movements, whereby to free the alcove for discarding it from said opening to leave the latter clear, each of said joints comprising a plunger in one part maintained in the other by a backing pin in the first part, and a spring in the latter backing the plunger free of the other part when the backing pin is removed.

References Cited

UNITED STATES PATENTS 1,209,164  12/1916  Johanson _____ 160—88 X
2,311,550  2/1943  Kauffman _____ 160—183 X DAVID J. WILLIAMOWSKY, *Primary Examiner.*

HARRISON R. MOSELEY, *Examiner.*

P. M. CAUN, *Assistant Examiner.*